United States Patent
Kraft

(10) Patent No.: US 9,856,670 B1
(45) Date of Patent: Jan. 2, 2018

(54) SHELTER

(71) Applicant: BUNKER SAFETY STRUCTURES, LLC, Edmond, OK (US)

(72) Inventor: Joe Kraft, Edmond, OK (US)

(73) Assignee: Bunker Safety Structures, LLC, Edmond, OK (US)

( * ) Notice: Subject to any disclaimer, the term of this patent is extended or adjusted under 35 U.S.C. 154(b) by 0 days.

(21) Appl. No.: 14/517,589

(22) Filed: Oct. 17, 2014

Related U.S. Application Data

(60) Provisional application No. 61/892,201, filed on Oct. 17, 2013.

(51) Int. Cl.
| | |
|---|---|
| *E02D 29/14* | (2006.01) |
| *E04H 9/14* | (2006.01) |
| *E04B 1/00* | (2006.01) |
| *E06B 5/02* | (2006.01) |
| *E06B 3/46* | (2006.01) |

(52) U.S. Cl.
CPC .............. *E04H 9/14* (2013.01); *E04B 1/0007* (2013.01); *E06B 3/4636* (2013.01); *E06B 5/02* (2013.01)

(58) Field of Classification Search
CPC ....... E04H 9/14; E06B 3/4636; E06B 1/0007; E06B 5/02
USPC ......... 52/19, 20, 169.6; 49/61, 63, 125, 127, 49/128, 130, 246, 247, 248, 253, 261, 49/254, 255; 296/213, 214, 223, 221, 296/217
See application file for complete search history.

(56) References Cited

U.S. PATENT DOCUMENTS

| | | | | |
|---|---|---|---|---|
| 4,981,290 | A * | 1/1991 | Huyer | B60J 7/05 296/214 |
| 5,218,794 | A * | 6/1993 | Ehrlich | 52/64 |
| 5,953,866 | A * | 9/1999 | Poole | 52/169.6 |
| 6,161,345 | A * | 12/2000 | Hope et al. | 52/169.6 |
| 7,428,800 | B1 * | 9/2008 | Vaughn et al. | 52/19 |
| 8,756,869 | B1 * | 6/2014 | Routt et al. | 52/20 |
| 2003/0167708 | A1 * | 9/2003 | Shaw et al. | 52/169.6 |
| 2008/0016611 | A1 * | 1/2008 | Khalaf et al. | 4/498 |
| 2011/0277398 | A1 * | 11/2011 | Crow | 52/169.6 |
| 2012/0079780 | A1 * | 4/2012 | Wirtz | 52/169.6 |
| 2014/0366462 | A1 * | 12/2014 | Richardson | 52/169.6 |

* cited by examiner

*Primary Examiner* — Brian Glessner
*Assistant Examiner* — Joshua Ihezie
(74) *Attorney, Agent, or Firm* — Hall Estill Attorneys at Law

(57) ABSTRACT

An apparatus and associated method for a sliding entry door assembly. The sliding door assembly has a frame, and a fixed lid attached to the frame. A rail is attached to the frame. A lid is selectively slidable upon the rail relative to the fixed lid to an opened position. A cam is selectively operable to raise the slidable lid to be flush with the fixed lid in a closed position.

1 Claim, 7 Drawing Sheets

SHELTER

RELATED APPLICATIONS

The current application claims priority to the U.S. Provisional Application Ser. No. 61/892,201 filed Oct. 17, 2013.

BACKGROUND

Technological advancements in storm shelter design have made them more affordable, and hence more available, to the homeowner. The market for storm shelters has grown significantly; underground storm shelters and safe rooms are much more prevalent in new home construction in recent years. Modern underground storm shelters are also readily adaptable to being installed inside the garage area of an existing house, without interfering with parking a car over the space occupied by the shelter. Typically, the prior attempted solutions provide an open top enclosure constructed of sheet metal, and a lid assembly constructed of plate steel. It has been determined by the inventors of this technology that the sheet metal construction can be improved upon, and that a two piece sliding lid can be improved by making the entire lid surface flush to the surrounding surface when the storm shelter is closed. It is to these improvements that the embodiments of the present invention are directed.

BRIEF DESCRIPTION OF THE DRAWINGS

Details of various embodiments of the present invention are described in connection with the accompanying drawings that bear similar reference numerals.

DESCRIPTION

Figure 1:
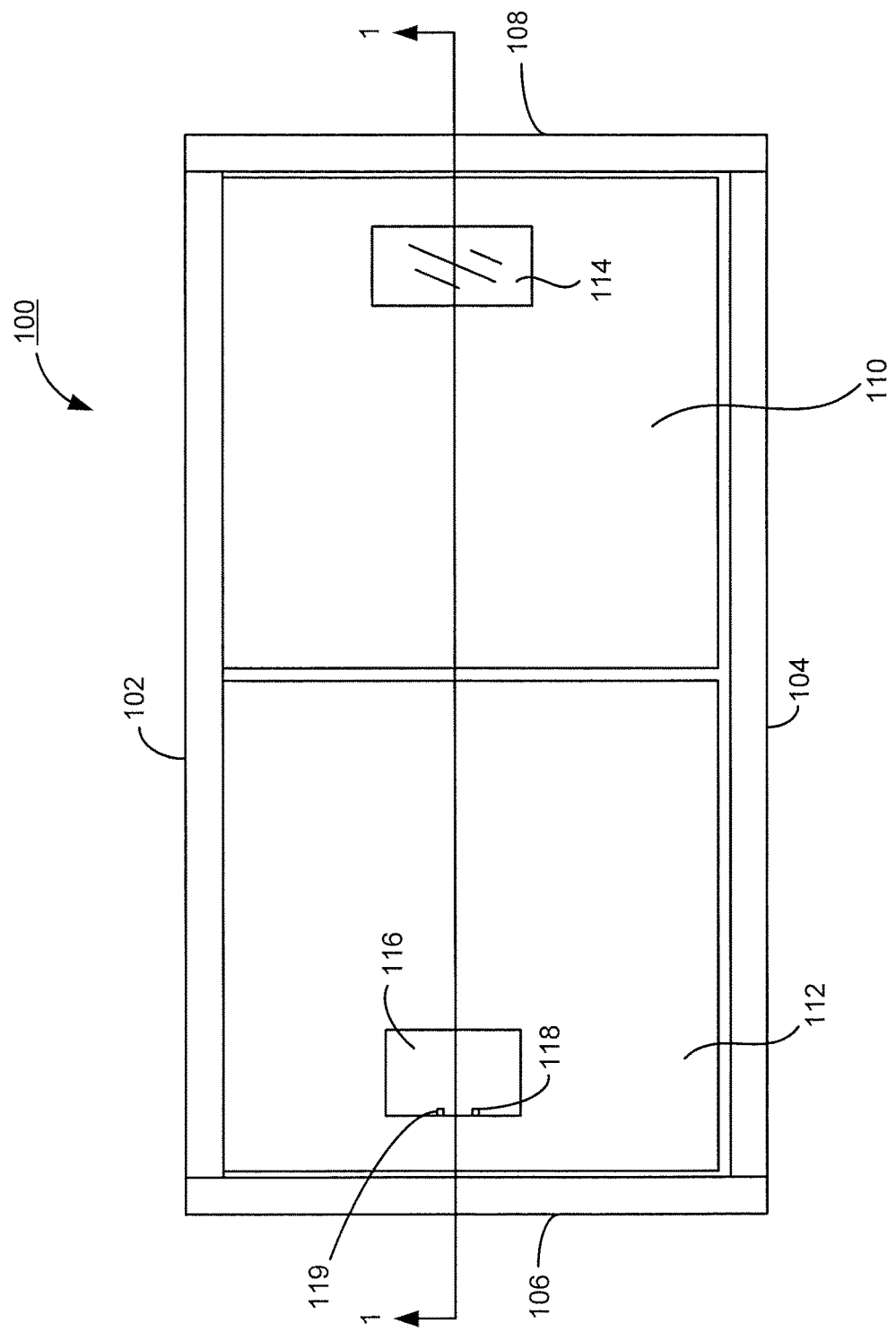
FIG. 1 depicts a top view of a sliding entry door assembly for an enclosure.

FIG. 1 depicts a top view of a sliding entry door assembly 100 that is constructed in accordance with illustrative embodiments of the present invention. For purposes of this description the sliding entry door assembly 100 is incorporated into an underground storm shelter, and as such is commonly referred to as a sliding lid assembly 100. More particularly, in the described embodiments the sliding lid 100 is sized to close the open top of a rectangular underground concrete structure, although the contemplated embodiments are not so limited. That is, in alternative equivalent embodiments the technology disclosed herein can be employed in other types of shelters both underground and above ground, and likewise can be employed in other types of non-shelter structures such as shipping containers and the like, without any need to enumerate all the possible applications for the skilled artisan to readily ascertain the nature and scope of the contemplated technology described herein.

The sliding lid assembly 100 has a structural framework made by joining opposing side members 102, 104 to opposing end members 106, 108. The members 102-108 are preferably metal structural framing members such as L-shaped beams welded together to define an opening. A stationary lid 110 is rigidly affixed to the framework to partially fill the opening. A sliding lid 112 is selectively moveable between the closed position depicted in FIG. 1 and an opened position. In the closed position the sliding lid 112 and the stationary lid 11 together fill the opening formed by the framework, thereby securely closing the shelter for its intended purpose.

A transparent window 114 can be provided in the stationary lid 11 so that occupants of the shelter can observe conditions outside the shelter. Alternative embodiments contemplate the window 114 in the sliding lid 112. To endure the potentially harsh conditions of storm debris hitting the window 114, and to adequately protect the occupants of the shelter, the window 114 is preferably constructed of a polycarbonate having a high impact strength such as ballistic grade Lexan®. In alternative embodiments not depicted more than one window can be constructed in either or both of the lids 110, 112.

The sliding lid 112 supports a hinged access panel 116 that can be locked in the closed position, such as by a key actuated lock 118. A finger hole 119, or alternatively a knob, gives the user a grasp of the access panel 116 for opening it.

Figure 2:
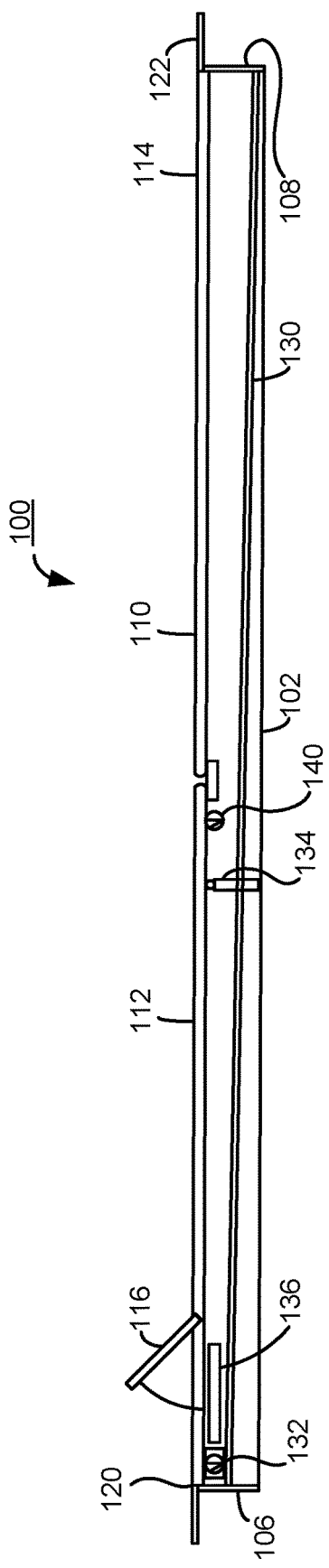
FIG. 2 depicts a cross sectional view along the line 1-1 in FIG. 1.

FIG. 2 depicts a cross sectional view taken along the section line 1-1 in FIG. 1, depicting the sliding lid 112 in the closed position. Importantly, the embodiments of this technology generally provide a sliding lid 112 that, in the closed position, forms an entirely flush surface with the surrounding floor surface. That is, in the closed position of the sliding lid 112 as depicted in FIG. 2, a top surface 120 of the end member 106 is flush to the top surface of the sliding lid 112. For the purposes of this description and meaning of the claims, the term "flush" means substantially coplanar, meaning two flush surfaces form substantially coplanar surfaces. The top surface of the sliding lid 112 is also flush with the top surface of the stationary lid 110 in the closed postition, and likewise flush with a top surface 122 of the other end member 108.

Figure 3:
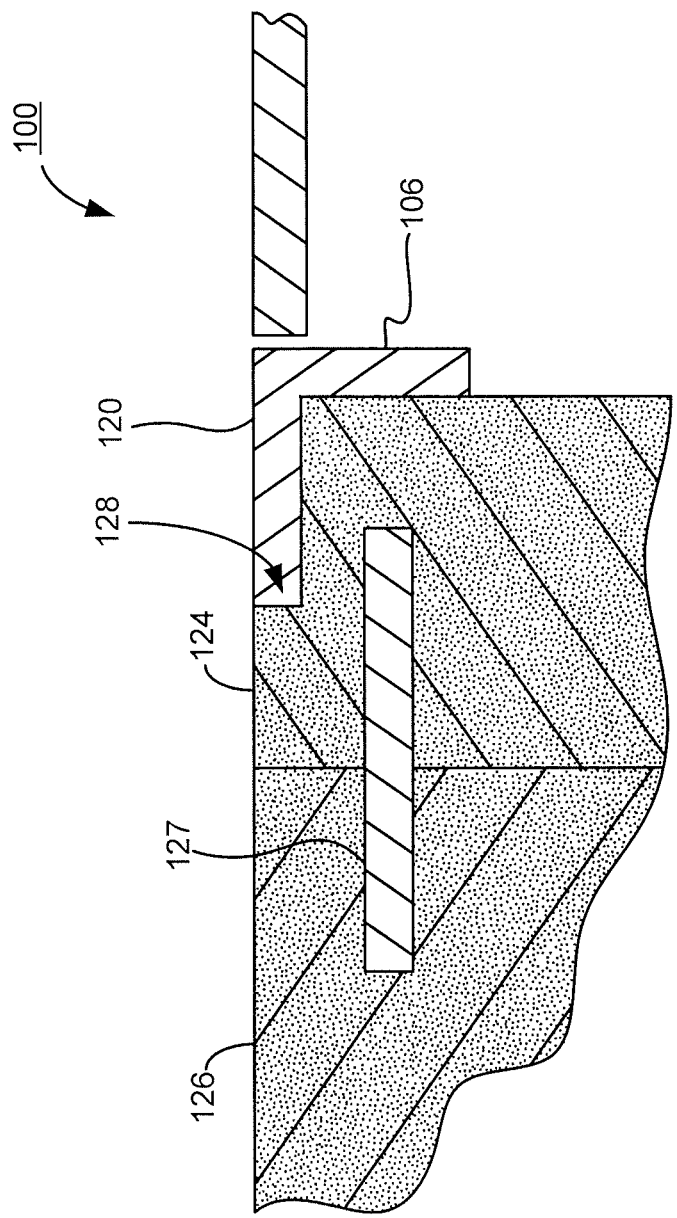
FIG. 3 depicts an enlarged cross sectional view of a portion of the assembly of FIG. 2 in an underground storm shelter.

The sliding lid assembly 100 thereby operates such that in the closed position it is entirely flush-mounted to the surrounding floor surface, such as flush to the surrounding concrete floor surface. FIG. 3 is an enlarged detail view of a portion of the sliding lid assembly 100 in the manner in which it can be receivingly engaged in the open top of an underground concrete enclosure 124, consisting of opposing poured concrete end walls (one of the concrete end walls depicted), opposing poured concrete side walls, and all extending from a poured concrete bottom.

To retrofit a storm shelter into an existing floor 126, an oversize trench is dug through the existing floor 126, concrete forms are placed inside the trench, and then concrete is poured against the forms to form the open-top enclosure 124. The existing floor 126 is drilled in multiple places to receive reinforcement rods 127 (such as rebar) before pouring the enclosure 124, to tie the newly poured concrete enclosure 124 to the existing floor 126. In these illustrative embodiments the concrete form provides a notch 128 around the perimeter of the top opening of the enclosure 124 to receive the end member 106 so that its top surface 120 is flush to both the enclosure 124 and the existing floor 126.

Returning to FIG. 2, a track 130 is supported by the side member 102. In these depicted embodiments the track 130 is sloped downwardly from the left-side to the right-side of the side member 102, although the contemplated embodiments are not necessarily so limited as discussed below. A roller 132 attached to the sliding lid 112 is rollingly supported upon the track 130. The track 130 is positioned to raise one end of the sliding lid 112 to be flush-mounted when the sliding lid 112 is closed, as depicted. A selectively rotatable cam 134 also attached to the sliding lid 112 is likewise supported upon the track 130 and, in turn, supports the other end of the sliding lid 112 to be flush-mounted when the sliding lid 112 is closed.

A lever 136 is externally accessible by opening the unlocked access panel 116. The lever 136 is depicted in the latched position in FIG. 2. In the latched position, a latch member (not depicted) that is fixed in rotation with the lever 136 lockingly engages a catch member (not depicted) such as may be supported by the end member 106. That locking engagement prevents any sliding movement of the sliding lid 112.

Figure 4:
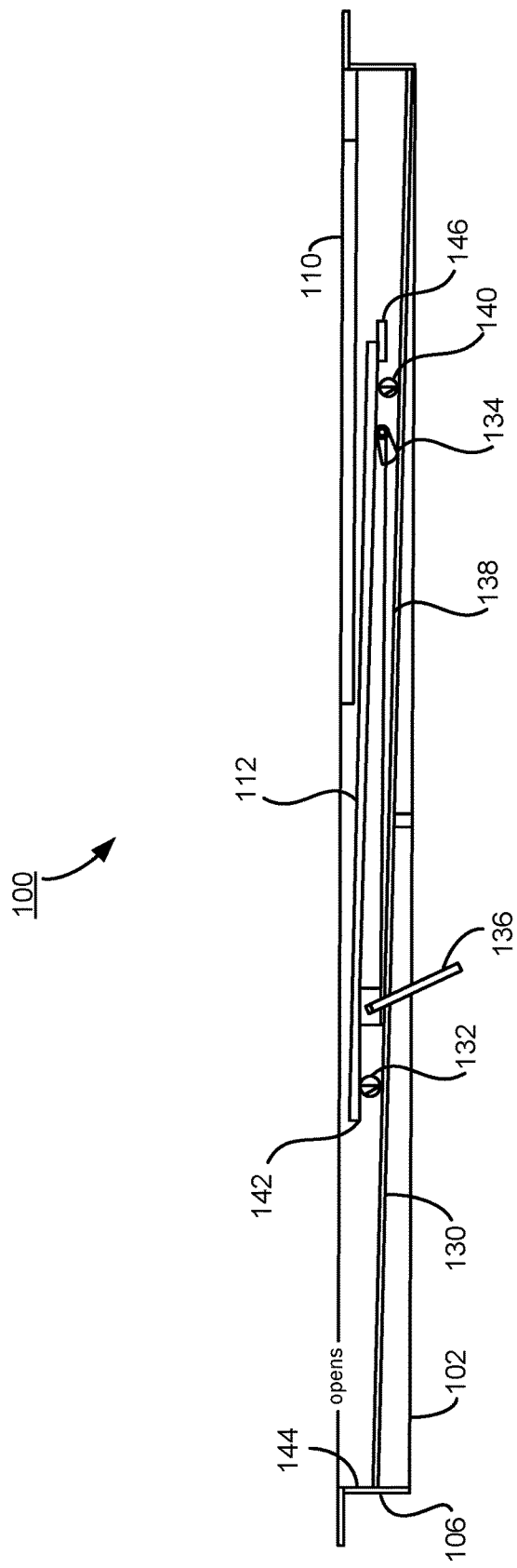
FIG. 4 depicts a cross sectional view similar to FIG. 2 but with the sliding lid partially opened.

A linkage 138 (FIG. 4) transfers the user's selected rotation of the lever 136 to a rotation of the cam 134. FIG. 4 depicts the lever 136 having been selectively rotated by the user in a clockwise direction to likewise rotate the cam 134 clockwise so that the cam 134 no longer contactingly engages the track 130. This is referred to as the "lowered" position of the sliding lid 112. In the lowered position, the contacting disengagement of the cam 134 from the track 130 causes that end of the sliding lid 112 to lower. The sliding lid 112 supports another roller 140 that rollingly engages the track 130 in the lowered position.

The clockwise rotation of the lever 136 also disengages the latch member from the catch member so that the sliding lid 112 has freedom of movement to roll upon the rail 130, such as to the partially opened position depicted in FIG. 4, to open the shelter so that the user can enter or exit the shelter. FIG. 4 depicts only one side of the sliding lid 112 in the manner that it is rollingly supported upon the track 130 on the side member 102, and it will be understood that the sliding lid 112 is likewise rollingly supported by a track (not depicted) on the opposing side member 104. Note that in the lowered position the sliding lid 112 is capable of rolling under the stationary lid 110. Advantageously, debris laying on either of the panels 110, 112 does not prevent the movement of the sliding lid 112 between the closed and opened positions.

FIG. 4 best depicts the sliding lid 112 has a tab 142 affixed thereto at one end so that, in the closed position of the sliding lid 112 depicted in FIG. 2, the tab 142 is receivingly engaged within an opening 144 defined in the end member 106. Similarly, the sliding lid 112 has another tab 146 affixed thereto at the other end so that, in the closed position of the sliding lid 112 depicted in FIG. 2, the tab 146 abuttingly engages the bottom side of the stationary lid 110. Engagement of the tabs 142, 146 in the closed position of the sliding lid 112 prevents any lifting force from raising the sliding lid 112 upwardly off the track 130.

Figure 5:
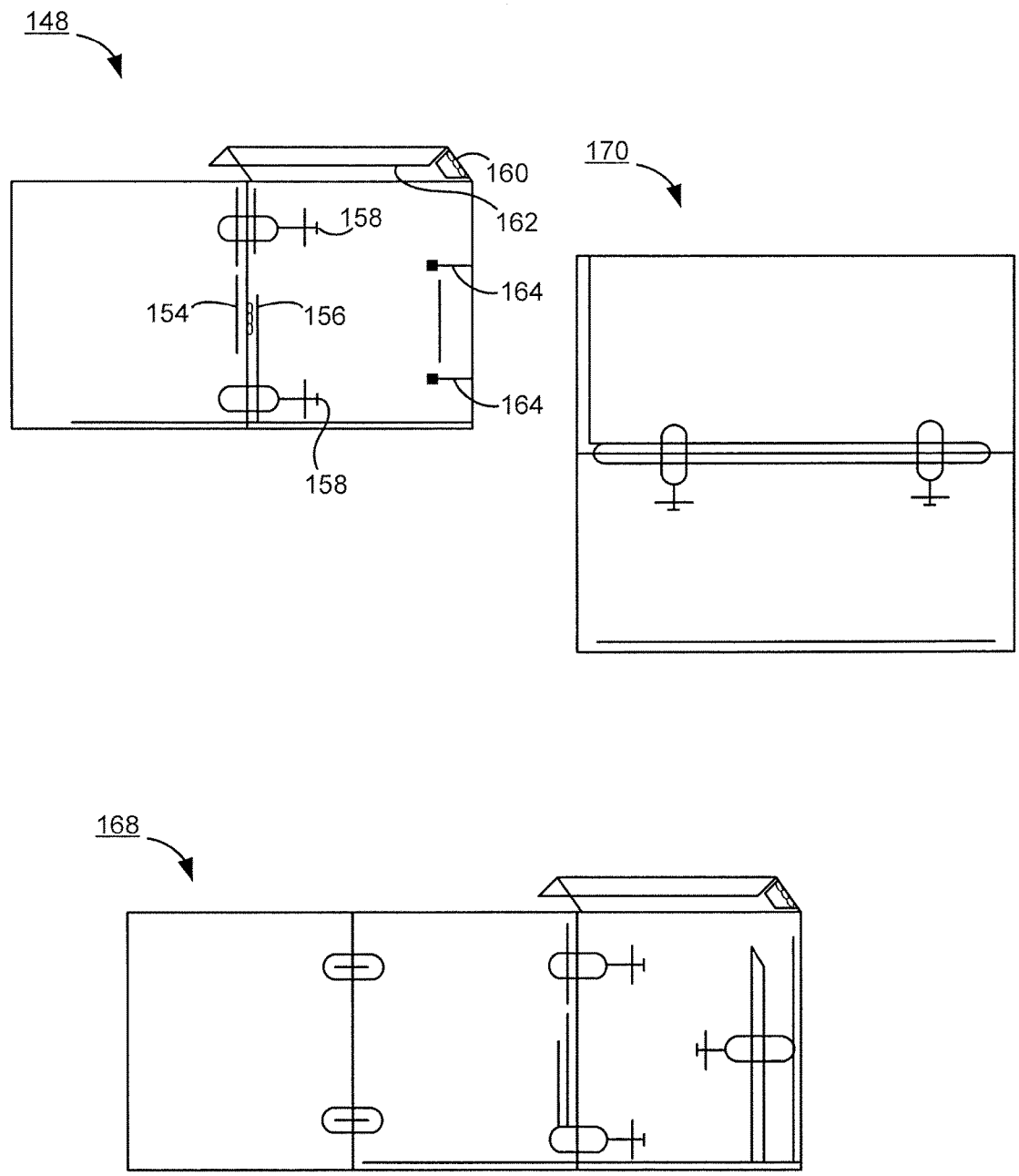
FIG. 5 depicts modular forms for constructing an underground open-top concrete enclosure that is sized to support the sliding entry door assembly of FIG. 1.
Figure 6:
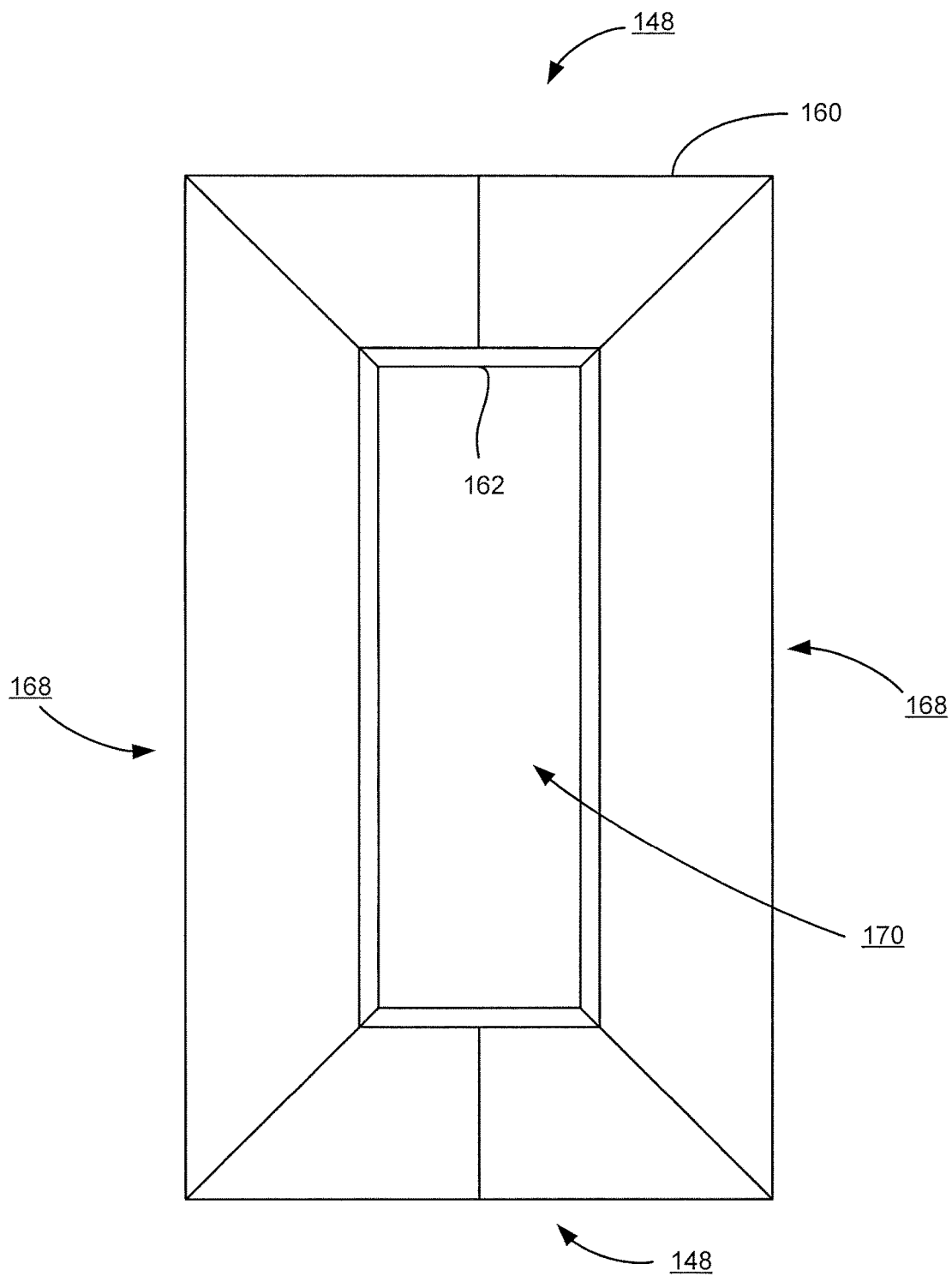
FIG. 6 depicts a top view of the concrete forms in FIG. 5 joined together for pouring the underground open-top concrete enclosure.

FIG. 5 depicts a modular concrete form system for constructing the open-top concrete enclosure to which the sliding lid assembly 100 is attached. An end panel assembly 148 is constructed by joining two panels 150, 152 together edge-to-edge. Flanges 154, 156 at the mating edges of the panels 150, 152 provide protuberant surfaces that are well adapted for connecting together with a clamping mechanism 158, such as a c-clamp or a vise-grip and the like. A flange 160 extends substantially orthogonal to the panel 152, and another flange 162 extends substantially orthogonal to the flange 160. Although not depicted, the panel 152 likewise has two orthogonal flanges extending inwardly and downwardly, respectively. Fastening members 164 can be affixed to yet another flange 166 to matingly align with openings in a flange on the side panel assembly 168. The side panel assembly 168 and the bottom panel assembly 170 are constructed in like manner. FIG. 6 is a top view depiction of two opposing end panel assemblies 148 and two opposing side panel assemblies 168 attached to the bottom panel assembly 170. Note that the top-side orthogonal flanges such as 160, 162 abuttingly engage each other to position the panel assemblies 148, 168 squarely to the bottom panel assembly 170. Preferably, the corner flanges are diagonally shaped to provide the mitered corners depicted in FIG. 6. The completely assembled forms advantageously permit constructing all four sides and the bottom of the enclosure 124 in a monolithic pour.

As mentioned above, the depicted embodiments are merely illustrative and in no way limiting of the contemplated embodiments. For example, in the depicted embodiments the track 130 is sloped relative to the floor surface about ten degrees from left to right, but in alternative equivalent embodiments more or less slope may be provided so long as the sliding lid 112 is operably capable of sliding under the stationary lid in the opened position of the sliding lid 112.

In yet other equivalent alternative embodiments the track can be substantially level relative to the floor surface. In that case each end of the sliding lid 112 can be raised and lowered by two cams linked to the lever for either individual or simultaneous selected rotation. In the latched position of the lever (as depicted in FIG. 2), two cams on each side of the sliding lid 112 can cooperatively and simultaneously lift respective ends of the sliding lid 112 to be flush-mounted. As described above, in the latched position the latching member also engages the catch member to prevent movement of the sliding lid 112. In the unlatched position of the lever (as depicted in FIG. 4) the two cams on each side of the sliding lid 112 cooperatively and simultaneously lower the sliding lid 112 so that both rollers on each side of the sliding lid 112 rollingly engage the respective track.

In either event of one or two cams on each side of the sliding lid 112, in other alternative embodiments of this technology the linkage can be eliminated by providing a lever connected directly to each cam. In that case one lever can be rotated to raise the sliding lid 112 to the closed position and another lever can be rotated to lock the sliding lid 112 in the closed position.

Figure 7:
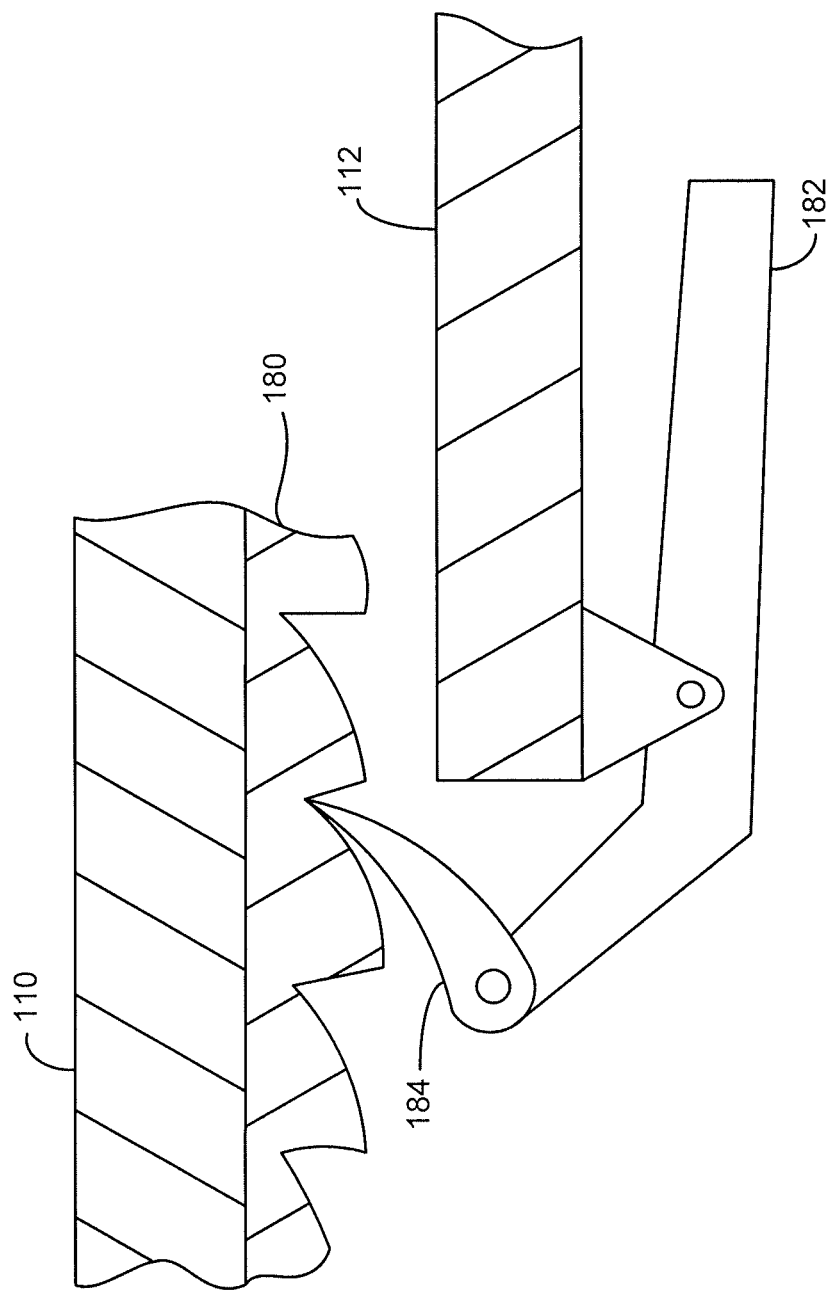
FIG. 7 depicts a built-in ratcheting mechanism to assist opening the sliding lid.

FIG. 7 depicts alternative embodiments that include an assist mechanism for opening the sliding lid 112. The built in feature can be advantageous in the event debris has fallen on the sliding lid 112, resisting the opening. In these illustrative embodiments a gear rack 180 is attached to the bottom side of the stationary lid 110. A ratcheting latch is pivotally connected to the bottom side of the sliding lid 112, having a handle 182 at one end and a pawl 184 at the other end. The pawl is preferably spring biased to maintain a contacting engagement with the gear rack 180, and the handle is preferably biased to the horizontal position depicted in FIG. 7. A user grasping the handle 182 and pivoting it clockwise forces the pawl 184 against the gear rack 180, resulting in a force that moves the sliding panel 112 in a direction toward the left, or toward the opened position, as depicted in FIG. 7.

The various features and alternative details of construction of the apparatuses described herein for the practice of the present invention will readily occur to the skilled artisan in view of the foregoing discussion, and it is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed.

What is claimed is:

1. A sliding entry door assembly, comprising:
   a frame and a stationary lid attached to the frame cooperatively defining an opening;
   a rail attached to the frame, having a first portion adjacent the opening and a second portion adjacent the stationary lid;
   a slidable lid having a roller and supported by rolling engagement of the roller against the rail between the first portion of the rail where the slidable lid is disposed between the rail and the opening, and the second portion of the rail where the slidable lid is diposed between the rail and the stationary lid;
   a cam that is selectively moveable between a first position, raising the roller off the rail and thereby preventing the roller from rolling on the rail to close the opening, and a second position, lowering the roller onto the rail to open the opening; and
   a lever connected to the cam to selectively move the cam between the first and second positions.

* * * * *